SEQUENTIAL CHANNEL SAMPLER DERIVING INDIVIDUAL CHANNEL GATING PULSES FROM SEQUENTIAL PORTIONS OF SINGLE SAWTOOTH PULSE

Filed May 22, 1961

INVENTOR.
WILLIAM C. ACKER

BY

ATTORNEY.

United States Patent Office 3,058,013

Patented Oct. 9, 1962

3,058,013

SEQUENTIAL CHANNEL SAMPLER DERIVING INDIVIDUAL CHANNEL GATING PULSES FROM SEQUENTIAL PORTIONS OF SINGLE SAW-TOOTH PULSE

William C. Acker, Seattle, Wash., assignor, by mesne assignments, to the United States of America as represented by the Secretary of the Navy Filed May 22, 1961, Ser. No. 111,878

9 Claims. (Cl. 307—88.5)

This invention relates to high speed electronic switching circuits for sampling a series of signal channels in a desired time sequence.

Circuits of the type referred to are employed in systems in which the outputs of a plurality of signal channels are to be sampled in a desired sequence, as for example in cathode ray tube apparatus for displaying the output of a mosaic of transducers, facsimile devices, time-sharing multiplexing systems, and data links for digital computers. The foremost requirement in such applications is stability and ease with which the circuit may be synchronized with other elements of the system.

It is therefore an object of the present invention to provide a new and improved switching circuit of the type referred to having a higher degree of stability and capable of being more readily synchronized with other system elements.

Other objects and many of the attendant advantages of this invention will be readily appreciated as the same becomes better understood by reference to the following detailed description when considered in connection with the accompanying drawing wherein.

Figure 1:
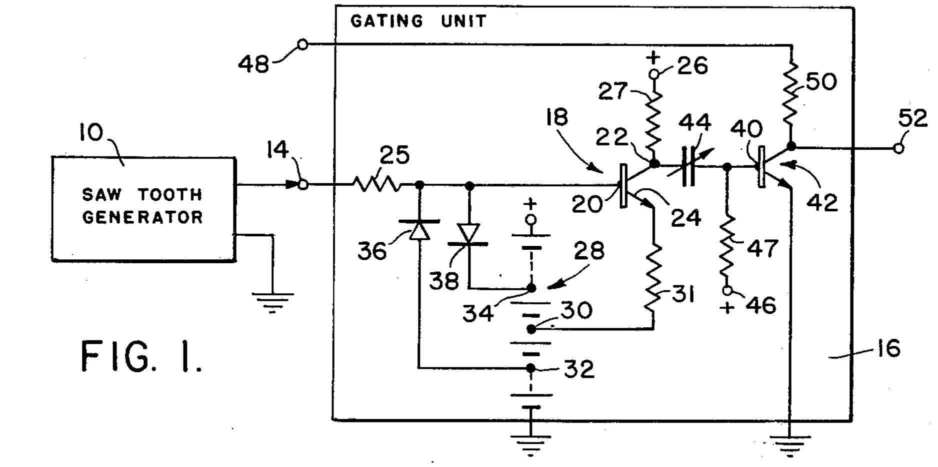
FIG. 1 is a schematic circuit diagram of the circuit embodying the present invention.
Figure 2:
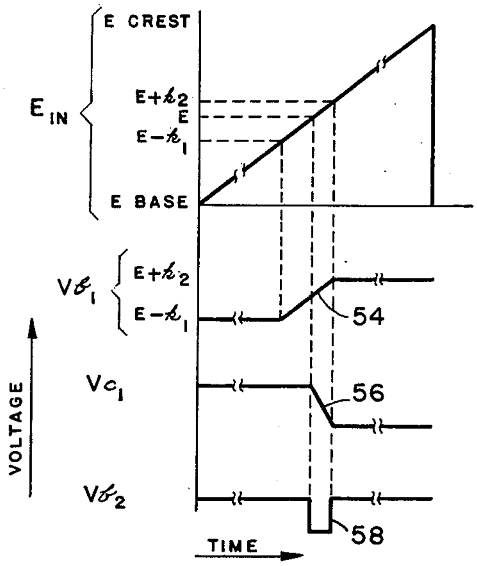
FIG. 2 is a graph illustrating voltage waveforms taken at various points throughout the circuit of FIG. 1.

Referring now to FIG. 1, a conventional sawtooth or linear sweep generator 10 provides a periodic switch control pulse, $E_{in}$, FIG. 2, having a waveform which rises linearly in a positive direction from a potential $E_{base}$ to a potential $E_{crest}$ and then substantially instantaneously returns to $E_{base}$ to commence a new cycle. The output of generator 10 is coupled to control signal input terminal 14 of a gating unit 16. Unit 16 comprises an NPN type transistor 18 which serves as a driver and amplifier and consists of a base electrode 20 comprising its input, a collector 22 comprising its output, and an emitter 24 comprising its common element between input and output. Base 20 is connected to control input 14 through a limiting resistor 25, and collector 22 is connected to a suitable direct current positive potential source 26 through a load resistor 27. A source of direct current potential 28 composed of serially connected battery cells has its negative terminal grounded and has a series of three taps consisting of a tap 30 providing a positive potential having a predetermined magnitude E lying somewhere between $E_{base}$ and $E_{crest}$, a tap 32 having a somewhat lower potential $E-k_1$, and a tap 34 havinga somewhat higher potential $E+k_2$. Emitter 24 is connected to tap 30 through a stabilizing or feedback resistor 31. A diode 36 is connected between base 20 and tap 32 with its anode connected to the base and its cathode to the tap, to limit or clamp the potential which may appear at base 20 in the negative direction to the potential $E-k_1$ to avoid undesired excessive potential differences across the base and emitter electrodes which could cause breakdown of the transistor, and a diode 38 is connected between base 18 and tap 34 with its cathode connected to the base and its anode to the tap, to limit or clamp the potential which may appear at base 20 in the positive direction to the potential $E+k_2$. Collector 22 of transistor 18 is coupled to the base 40 of an NPN transistor 42 through an adjustable capacitor 44. Base 40 is connected to tap 46 of a source of positive direct current through a resistor 47. The magnitude of the potential at tap 46 is sufficient to forward bias the transistor to conduct at saturation. Capacitor 44 and resistor 47 together comprise a differentiating network which causes the derivative of the potential at the collector 22 of transistor 18 to appear at the base of transistor 40. Gating unit 16 has an input terminal 48 to which the signal to be gated is applied. Input terminal 48 is returned to ground through a network consisting of a voltage dividing resistor 50 and the internal base to emitter circuit of transistor 42. Gating unit 16 has an output terminal 52 located at the junction between resistor 50 and the collector of transistor 42. Transistor 42 serves as a switch normally presenting a low impedance between signal output terminal 52 and ground to prevent the signal from appearing on terminal 52 because of the forward biasing positive potential of tap 46 on its base 40, and presenting a high impedance to permit the signal to appear at terminal 52 when the transistor is reverse biased by application of a negative potential to its base.

In the operation of the circuit of FIG. 1, reference is made to FIG. 2 wherein the abscissa represents the time period of one cycle of sawtooth generator 10 and the ordinate represents voltage. Curve $E_{in}$ is taken by measuring the voltage between terminal 14 and ground; curve $Vb_1$ by measuring the voltage between base 20 of transistor 18 and ground; curve $Vc_1$ by measuring the voltage between collector 22 of transistor and ground, and curve $Vb_2$ by measuring the voltage between base 40 of transistor 42 and ground.

As an example of operation it is assumed that the switching control pulse $E_{in}$ is applied to switching control input terminal 14. Prior to curve $E_{in}$ reaching the potential $E-k_1$ diode 36 is conducting because its cathode is negative with respect to its anode due to the positive voltage applied to the anode. This limits or clamps the potential at base 20 to $E-k_1$ and as a result the base is negative with respect to the emitter by the difference in potential between taps 30 and 32 which reverse biases the base circuit and renders NPN transistor 18 cut-off. The potential difference between taps 30 and 32 serves as a standoff potential to avoid current leakage problems while the transistor is cut-off. When the voltage of curve $E_{in}$ exceeds $E-k_1$ diode 36 becomes non-conductive and $E_{in}$ is applied directly to base 20 as represented by slope 54, curve $Vb_1$, FIG. 2. When $E_{in}$ reaches the magnitude E, the base 20 becomes positive, the reverse bias is overcome, and transistor 18 begins to conduct, which causes an amplified reproduction of slope 54 to appear at the collector, but of reverse polarity, as shown by slope 56 of curve $Vc_1$. It will be apparent that transistor 18 and its input network constitutes a stage which serves as a selective circuit to pass the portion of the slope of curve $E_{in}$ extending from E to $E+k_2$. Slope 56 of curve $Vc_1$ is differentiated by the differentiating network comprising capacitor 44 and resistor 46. Since the derivative of a linear slope is a constant, the potential at base 40 of transistor 42 drops to a predetermined value as indicated by pulse 58 of curve $Vb_2$ and remains at this value during the portion of slope 54 from E to $E+k_2$. The circuit parameters are so chosen that this drop in potential is sufficient to overcome the forward bias in the base circuit of transistor 42 and to reverse bias the transistor to a cut-off condition so that its collector circuit presents a high impedance and the signal applied to terminal 48 appears at output terminal 52. When $E_{in}$ reaches the value $E+k_2$, diode 38 conducts, the voltage appearing at base 20 of transistor 18 is clamped to the value $E+k_2$, the potential at collector 22 can no longer change, the derivative of the collector potential appearing across resistor 47 becomes zero, and the collector voltage returns to its normal forward biasing value determined by the potential at terminal 46 causing transistor 42 to resume its conducting condition to shunt the signal at terminal 52 to ground. The cycle is completed when $E_{in}$ decays, allowing diode 38 to return to its non-conducting condition and allowing diode 36 to resume its conducting condition. The transients occurring during this decay, not shown, do not adversely affect operation of the circuit.

Preferably, the value of $k_2$, the difference in potential between taps 30 and 34, is chosen to react on the circuit parameters of transistor 18 in such a manner that the transistor just reaches a condition of collector saturation as the potential is claimed to the potential $E+k_2$, so that transistor 18 acts as a linear amplifying circuit substantially throughout amplification of slope 54, but shortly before the end of slope 54 the collector current is limited by saturation and any further increase in base current does not cause an appreciable increase in collector current. This non-linearity at the end of its amplifying action serves to provide greater stability during the remainder of the periods of pulse $E_{in}$, much in the same manner as in saturating type transistor switching circuits. Thus transistor stage 18 is somewhat of a hybrid combination of an amplifier and a switch.

Figure 3:
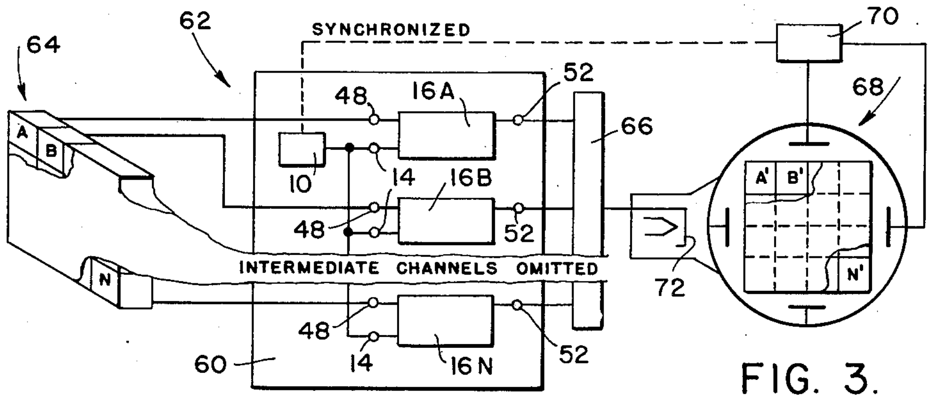
FIG. 3 is a block diagram of a portion of a sound-to-image transducer system employing a switching circuit embodying the invention.

FIG. 3 shows a switching network 60 composed of gating units like that of FIG. 1 employed in a sound-to-image transducing system 62 of the type generally disclosed in U.S. Patent 2,453,502 for use in classification of underwater targets. Reflected sound from a submarine or other target is acoustically focused on a mosaic 64 of small hydrophones. In the interest of avoiding unnecessary duplication only three hydrophones, A, B and N are shown. The outputs of the hydrophones, which are rectified by suitable detection means, not shown, are connected to the signal input terminals 48 of a corresponding series of gating units 16A, 16B, 16N, each of which is identical to unit 16 of FIG. 1. A common sawtooth generator 10, like that of FIG. 1, is connected to the switching control input terminal 14 of each gating unit. Within the series of gating units the values of direct current potential E established at the tap 30 (not shown but identical to FIG. 1) of each successive unit in the series is made progressively more positive by an increment equal to $k_2$, the difference between the potential at taps 30 and 34 within each unit. For instance, if $k_2$ is equal to one volt and the potential at taps 30 and 34 of gating unit 16A is 3 and 4 volts, respectively, then the potential at the corresponding taps of the next successive gating unit 16B, would be 4 volts and 5 volts, and so on. It will be apparent that the rising voltage of the switching control pulse renders gating units 16A, 16B, 16N operative to sample each hydrophone signal in turn with equal sampling intervals and with samples following one another in immediate succession. The outputs of all the gating units are connected to a common summing network 66 which at its output provides a cyclic train of samples of the signals of each hydrophone. The train of signal samples repeats itself at the frequency of signal generator 10.

Associated with system 62 is a cathode ray tube 68 and a conventional cathode ray tube horizontal and vertical sweep network 70 operatively connected to the electron beam deflecting elements of the tube. The cyclic train of samples at the output of summing network 66 is coupled to the modulating element of tube 72 and sweep network 70 is synchronized with sawtooth generator 10, by pulse circuit techniques well known in the art such as employing a common master oscillator and frequency dividing circuits, in such manner as to present the sampled hydrophone signals as picture elements A', B', N on the face of the tube 68 at positions corresponding to the positions of the respective hydrophones in mosaic 64. The result is a continuous display on the face of tube 68 of an image representing the intensity of sound energy incident on the hydrophones of mosaic 64, producing a visual image of the target from which the sound is reflected.

The following circuit specifications are included by way of an example only, to provide a circuit suitable for sampling one hundred channels in sequence using a separate gating unit for each channel at a rate of 1,000 samples per second per channel.

Transistors 18 and 42—NPN type 2N167
Diodes 36 and 38—type 1N270
Resistor 25—depends upon control input voltages
Resistor 27—3.3K ohms
Resistor 31—330 ohms
Resistor 47—10K ohms
Resistor 50—4.7K ohms
Capacitor 44—50 to 500 piccofarads (adjusted to obtain optimum differentiation)
Voltage at tap 26—voltage at tap 30 plus ten volts
Voltage at tap 30—depends on control input voltages
Voltage at tap 32—voltage at tap 30 less two volts
Voltage at tap 34—voltage at tap 30 plus one volt
Voltage at tap 46—one volt positive Obviously many modifications and variations of the present invention are possible in the light of the above teachings. It is therefore to be understood that within the scope of the appended claims the invention may be practiced otherwise than as specifically described.

What is claimed is:

1. A circuit for sampling first and second signal channels in desired sequence, comprising, in combination; first means for producing a first signal pulse having a linearly rising waveform, first and second normally closed gates serially connected in said first and second signal channels, respectively, said gates each having a gate control circuit operatively connected to said first means and comprising a selective circuit adapted to pass a portion of said waveform occurring between predetermined amplitude limits and a differentiating network for differentiating said portion of the waveform to derive a second gate control pulse having a rectangular waveform to open the associated gate for the duration of said rectangular waveform, the amplitude limits between which the first pulse waveform is passed by the selective network in each gate control network being so chosen to open the respective gates in desired sequence.

2. Apparatus in accordance with claim 1 wherein said first pulse is cyclically produced by said first means at a desired frequency to thereby repetitively sample said channels.

3. Apparatus in accordance with claim 1 wherein the amplitude difference between the said limits is predetermined to control the interval over which each signal is sampled.

4. Apparatus in accordance with claim 1, wherein said predetermined limits comprise a lower limit and an upper limit and wherein each of said selective circuits comprises an amplifier having an amplifier input circuit adapted to receive said first pulse, said amplifier input circuit including means for biasing said amplifier input circuit to cause the amplifier to be cut off until said first signal pulse reaches said lower limit and means for limiting the signal appearing in said amplifier input circuit to prevent same from rising above said upper limit.

5. Apparatus in accordance with claim 4, said amplifier having an amplifier output circuit having a saturation limit, said amplifier being driven to said saturation limit prior to said pulse reaching said upper limit of said predetermined limits.

6. Apparatus in accordance with claim 5 wherein said amplifier is a first transistor of the type having base, emitter, and collector electrodes, said amplifier input circuit being connected to the base and emitter electrodes, said output circuit of the amplifying device being connected to the collector and emitter electrodes.

7. Apparatus in accordance with claim 6 including second means for limiting the signal appearing in said amplifier input circuit to prevent same from dropping below a predetermined value below said lower limit to obviate undesired excessive potential difference across the base and emitter electrodes prior to said first pulse reaching said lower limit.

8. Apparatus in accordance with claim 6 wherein said gate comprises a second transistor adapted to operate as a switch alternatively having a conducting and a non-conducting state of operation, said transistor being adapted to change from one to another of said states of operation in response to said second gate control pulse.

9. Apparatus in accordance with claim 8, said second transistor having base, emitter and collector electrodes, said gate control circuit being connected to said base and emitter electrodes, said differentiating network comprising a capacitor connected between the collector of the first transistor and the base of the second transistor and a resistor connected between the base of the second transistor and the emitter of the second transistor.

No references cited.